(12) United States Patent
Tiedemann, Jr. et al.

(10) Patent No.: US 6,876,867 B2
(45) Date of Patent: Apr. 5, 2005

(54) METHOD AND APPARATUS FOR PERFORMING FAST POWER CONTROL IN A MOBILE COMMUNICATION SYSTEM

(75) Inventors: Edward G. Tiedemann, Jr., San Diego, CA (US); Joseph P. Odenwalder, Del Mar, CA (US); Charles E. Wheatley, III, Del Mar, CA (US); Roberto Padovani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/825,511

(22) Filed: Apr. 3, 2001

(65) Prior Publication Data

US 2001/0014589 A1 Aug. 16, 2001

Related U.S. Application Data

(63) Continuation of application No. 09/454,926, filed on Dec. 3, 1999, which is a continuation of application No. 08/958,882, filed on Oct. 27, 1997, now Pat. No. 6,035,209, which is a continuation of application No. 08/414,633, filed on Mar. 31, 1995, now abandoned.

(51) Int. Cl.[7] .............................................. H04B 7/005
(52) U.S. Cl. ......................... 455/522; 455/69; 455/115; 455/117
(58) Field of Search ........................ 455/69, 38.3, 54.1, 455/67.1, 115, 33.1, 53.1, 56.1, 68, 70, 126–127, 522, 117, 574, 343; 370/44, 58, 98–99, 107, 311

(56) References Cited

U.S. PATENT DOCUMENTS

| | | | | |
|---|---|---|---|---|
| 5,128,965 A | * | 7/1992 | Henriksson | 375/285 |
| 5,305,468 A | * | 4/1994 | Bruckert et al. | 455/69 |
| 5,390,338 A | * | 2/1995 | Bodin et al. | 455/422 |
| 5,465,389 A | * | 11/1995 | Agrawal et al. | 455/437 |
| 6,356,745 B1 | * | 3/2002 | Lee et al. | 455/232.1 |
| 6,373,823 B1 | * | 4/2002 | Chen et al. | 370/252 |
| 6,377,813 B1 | * | 4/2002 | Kansakoski et al. | 455/522 |
| 6,490,460 B1 | * | 12/2002 | Soliman | 455/522 |
| 6,546,260 B2 | * | 4/2003 | Esmailzadeh et al. | 455/522 |

* cited by examiner

*Primary Examiner*—Pablo N. Tran
(74) *Attorney, Agent, or Firm*—Philip Wadsworth; Thien T. Nguyen; Kyong H. Macek

(57) ABSTRACT

A method and apparatus for controlling transmission power levels in a mobile communication system. The method provides for a closed-loop power control method. A mobile station provides information on the quality of the signal received from the base station, and the base station responds by adjusting the power allocated to that user in a shared base station signal. The transmission power is adjusted initially by a large increment and then ramped down at an increasingly decreasing rate. The mobile station also provides information to the base station as to its relative velocity and the base station adjusts its transmission power in accordance with this velocity information.

11 Claims, 3 Drawing Sheets

METHOD AND APPARATUS FOR PERFORMING FAST POWER CONTROL IN A MOBILE COMMUNICATION SYSTEM

CROSS REFERENCE INFORMATION

This application is a continuation application of U.S. Pat. No. 6,317,587, filed Dec. 3, 1999 and issued on Nov. 13, 2001, which is a continuation application of Ser. No. 08/958,882, filed Oct. 27, 1997, U.S. Pat. No. 6,035,209, issued on Mar. 7, 2000, which is a file wrapper continuation application of Ser. No. 08/414,633, filed Mar. 31, 1995, now abandoned.

BACKGROUND OF THE INVENTION

I. Field of the Invention

The present invention relates to communication systems. More particularly, the present invention relates to a novel and improved method and apparatus for controlling transmission power in a mobile communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in copending U.S. Pat. No. 5,414,796 which is a continuation application of U.S. patent application Ser. No. 07/713,661, filed Jun. 11, 1991, now abandoned, entitled "VARIABLE RATE VOCODER", assigned to the assignee of the present invention, of which the disclosure thereof is incorporated by reference herein.

The use of a variable rate speech encoder provides for data frames of maximum speech data capacity when said speech encoding is providing speech data at a maximum rate. When a variable rate speech coder is providing speech data at a less that maximum rate, there is excess capacity in the transmission frames. A method for transmitting additional data in transmission frames of a fixed predetermined size, wherein the source of the data for the data frames is providing the data at a variable rate is described in detail in copending U.S. Pat. No. 5,504,773, which is a continuation application of U.S. patent application Ser. No. 07/822,164, filed Jan. 16, 1992, now abandoned, entitled "METHOD AND APPARATUS FOR THE FORMATTING OF DATA FOR TRANSMISSION", assigned to the assignee of the present invention, of which the disclosure thereof is incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, which is a continuation application of U.S. patent application Ser. No. 07/846,312, filed Mar. 5, 1992, now abandoned, entitled "DATA BURST RANDOMIZER", assigned to the assignee of the present invention, of which the disclosure thereof is incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR TELEPHONE SYSTEM", assigned to the assignee of the present invention, of which the disclosure thereof is incorporated by reference herein.

In a communication system that provides data using a QPSK modulation format, very useful information can be obtained by taking the cross product of the I and Q components of the QPSK signal. By knowing the relative phases of the two components, one can determine roughly the velocity of the mobile station in relation to the base station. A description of a circuit for determining the cross product of the I and Q components in a QPSK modulation communication system is disclosed in U.S. Pat. No. 5,506,865, entitled "PILOT CARRIER DOT PRODUCT CIRCUIT", assigned to the assignee of the present invention, the disclosure of which is incorporated by reference herein.

In an alternative continuous transmission strategy, if the data rate is less than the predetermined maximum the data is repeated within the frame such that the data occupies the full capacity of the data frame. If such a strategy is employed, power consumption and interference to other users may be reduced during periods of data transmission at less than the predetermined maximum by reducing the power at which the frame is transmitted. This reduced transmission power is compensated by the redundancy in the data stream and can offer benefits in range for a fixed maximum transmission power.

A problem that is encountered in controlling transmission power in the continuous transmission strategy is that the receiver does not know the transmission rate a priori and so does not know the power level that should be received. The present invention provides a method and apparatus for controlling transmission power in a continuous transmission communication system.

SUMMARY OF THE INVENTION

The present invention is a novel and improved method and apparatus for closed loop transmission power control in a communication system. It is an object of the present invention to provide timely power control that is necessary to provide robust communication link quality under fading conditions.

Further, it should be noted that power control techniques are presented in the exemplary embodiment in a spread spectrum communication system, however, the methods presented are equally applicable for other communication systems. Also, the exemplary embodiment used for the control of transmission power in transmissions from a base station to a remote or mobile station may be applied to the control of transmission power in transmissions from a remote or mobile station to a base station.

In the exemplary embodiment, a base station transmits packets of data to a mobile station. The mobile station receives, demodulates and decodes the received packet. If the mobile station determines that the received packet cannot be reliably decoded, it sets the normally '0' quality response power control bit to '1' indicating the situation to the base station. In response, the base station increases the transmission power of the signal to the mobile station.

In the exemplary embodiment of the present invention, when the base station increases its transmission power it does so with a relatively large step in transmission power which is assumed to be more than adequate under most fading conditions. The base station then decreases the transmission power level at an exponentially decreasing rate as long as the quality response power control bits remain at '0'. In an alternative embodiment, the base station responds to a request from the mobile station for additional signal power by increasing the signal power incrementally.

In an improved embodiment of this power control system, the base station will determine whether the error reported by the mobile station was of a random nature in which case it will immediately begin ramping down the transmission power or whether the error was an error resulting from a genuine fading condition. The base station distinguishes errors of a random nature from those of a prolonged nature by examining the patterns of power control bits sent by the mobile station. If the pattern of power control request signals and sends a 1-bit quality power control response in the packets it transmits back to the base station and indicates that there is a new fading condition present in the propagation path, then the base station will refrain from decreasing the transmission power.

One of the identified sources of sudden changes in the propagation path of a mobile station is a change in velocity relative to the position of the base station. That is, if the velocity towards the mobile station or away from the mobile station is changing. In the present invention, the mobile station determines that the velocity relative to the base station is changing, and if necessary, sets the power control bits to request additional power from the base station to accommodate the change in velocity.

In a first exemplary embodiment, the mobile station is equipped with a motion sensor which may operate off of information from the speedometer or tachometer in the case of an automobile based mobile station. The mobile station then generates the power control signal in accordance with the signal from the motion sensor.

In a second exemplary embodiment, the mobile station may sense a shift in the received signal from the base station in order to sense motion. In the exemplary embodiment, the mobile station determines the changes in relative velocity by measuring the Doppler shift in the received pilot signal.

In a third exemplary embodiment, the base station determines the presence of motion by sensing changes in the incoming signal and adjusts transmission power in accordance with these changes.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
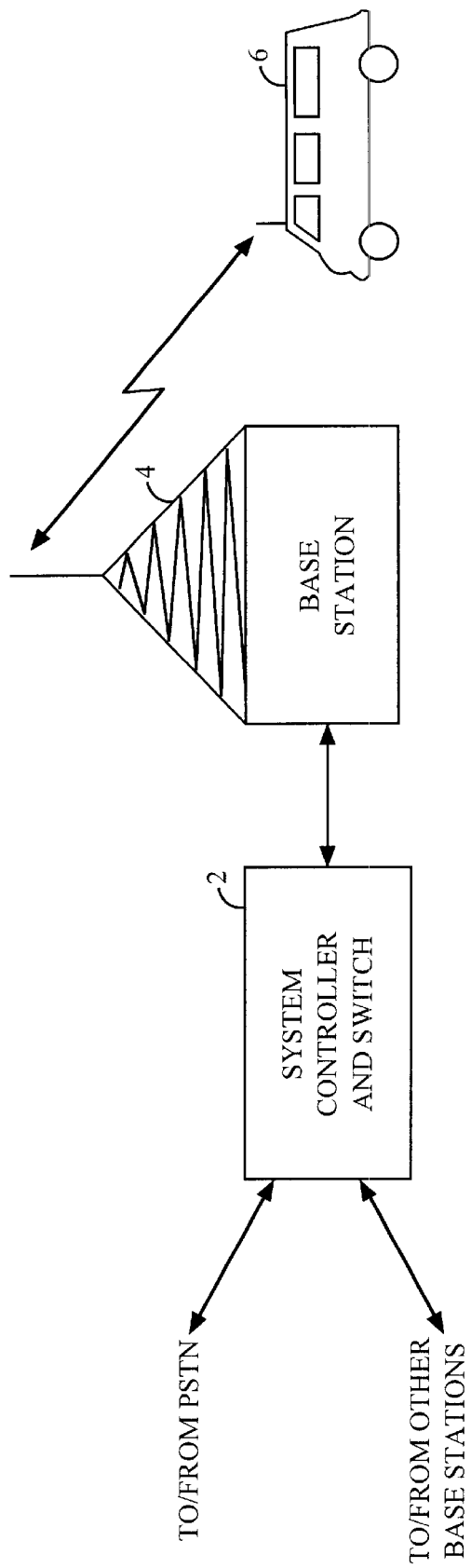
FIG. 1 is an illustration of an exemplary mobile telephone system.

Referring to FIG. 1, the present invention is illustrated in an exemplary implementation in a mobile communication system for controlling the power of transmissions between base station 4 and mobile station 6. Information may be provided to and from a public switched telephone network (PSTN) to system controller and switch 2, or may be provided to and from controller and switch 2 by another base station if the call is a mobile station to mobile station communication. System controller and switch 2, in turn, provides data to and receives data from base station 4. Base station 4 transmits data to and receives data from mobile station 6.

In the exemplary embodiment the signals transmitted between base station 4 and mobile station 6 are spread spectrum communication signals, the generation of the waveforms of which are described in detail in the above mentioned U.S. Pat. No. 4,901,307 and U.S. Pat. No. 5,103,459. The transmission link for communication of messages between mobile station 6 and base station 4 is referred to as the reverse link and the transmission link for communication of messages between base station 4 and mobile station 6 is referred to as the forward link. In the exemplary embodiment, the present invention is used to control the transmission power of base station 4. However, the methods of power control of the present invention are equally applicable to controlling the transmission power of mobile station 6.

Figure 2:
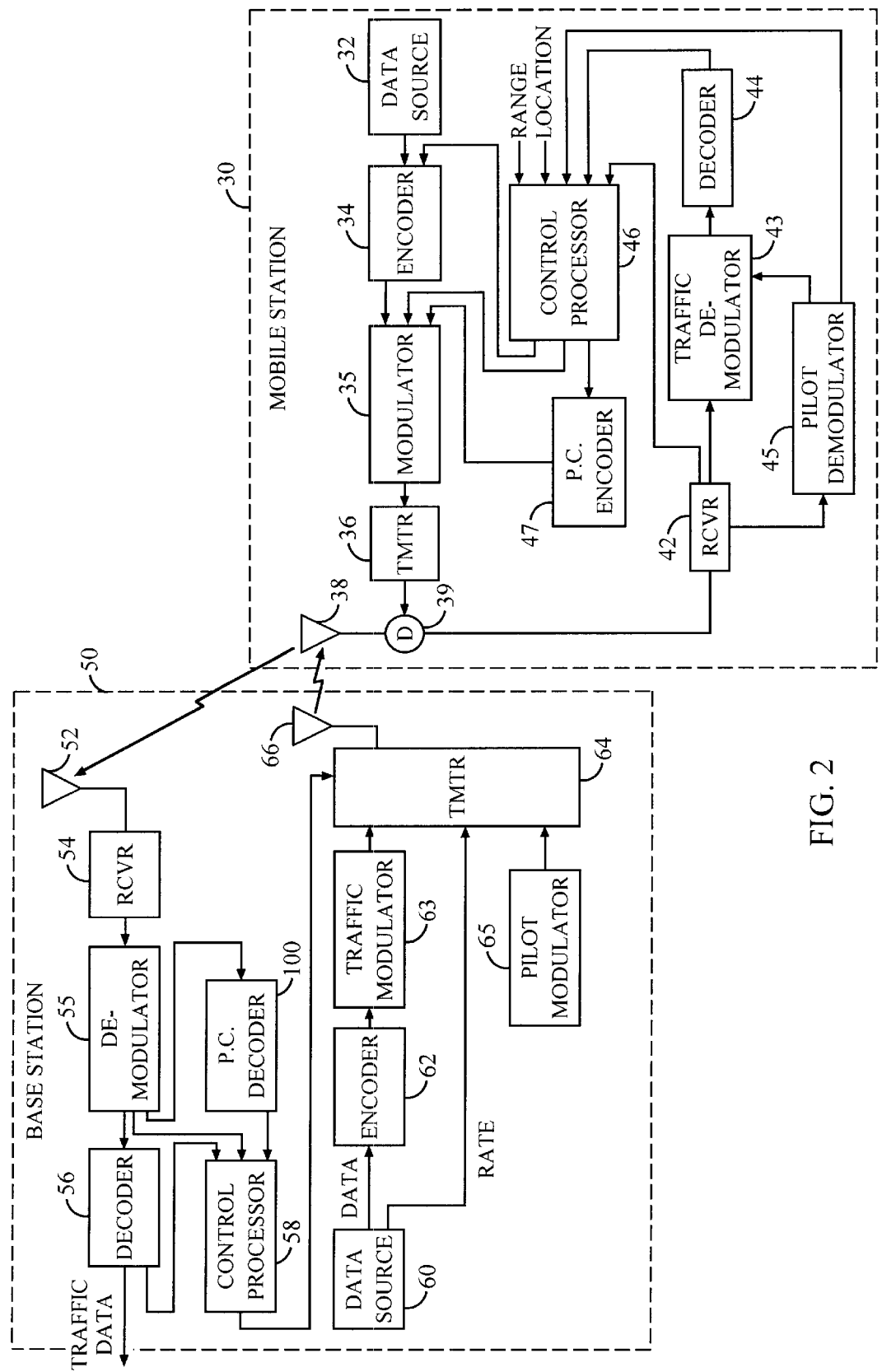
FIG. 2 is an illustration of the apparatus of the present invention.

Referring to FIG. 2, base station 50 and mobile station 30 are illustrated in block diagram form showing the apparatus for providing control of the transmission power of base station 50 of the present invention. If a communication link degrades, then the link quality can be improved by increasing the transmission power of the transmitting device. In the exemplary embodiment of controlling transmission power of base station 50, some of the methods for determining that the transmission power of base station 50 should be increased include:

(a) mobile station detection of frame errors on forward link;
(b) mobile station detects that received power is low on forward link;
(c) mobile station to base station range is large;
(d) mobile station location is poor;
(e) mobile station change in velocity; and
(f) mobile station detects received power on pilot channel is low on forward link.

Conversely, some of the methods for determining that the transmission power of base station 50 should be decreased include:

(a) mobile station quality responses to the base station show a low frame error rate for the forward link;
(b) mobile station detects that received power is high on forward link;
(c) base station to mobile station range is low;
(d) mobile station location is good; and
(e) mobile station detects that received power on forward link pilot channel is high.

When base station 50 detects a need to modify the transmission power of the forward link, control processor 58 sends a signal specifying a modified transmission power to transmitter (TMTR) 64. The modified power signal may simply indicate a need to increase or decrease the transmission power or it may indicate an amount to change the signal power or it may be an absolute signal power level. In response to the modified power level signal, transmitter 64 provides all transmission at the modified transmission power level.

It should be noted that data source 60 may source modem, facsimile or speech data. Data source 60 may be a variable rate source that varies its transmission rate on a frame to frame basis throughout the transmission or may be able to vary rates only upon command. In the exemplary embodiment, data source 60 is a variable rate vocoder. The design and implementation of a variable rate speech vocoder are described in detail in U.S. Pat. No. 5,414,796, issued May 9, 1995. The output from data source 60 is encoded by encoder 62 and input to traffic modulator 63 for modulation and input to transmitter 64. Also input to transmitter 65 is a synchronous pilot signal for transmission.

A need for modification of the transmission power may be indicated by any one of the conditions enumerated above or by any combination of those conditions. If the method of power control is based upon a position related effect such as range or mobile station location, then an external signal (LOCATION) is provided to control processor 58 of base station 50 indicative of the location condition. The range condition can be detected by base station 50. In an alternative embodiment the range condition can be detected by mobile station 30 and transmitted to base station 50. In response to the detected range condition control processor 58 in base station 50 generates a control signal for modifying transmission power of transmitter 64.

In a closed loop power control implementation, power control signals are provided from mobile station 30 to base station 50. Mobile station 30 may determine the power control signal in accordance with received power or alternatively in accordance with the detection of frame errors. The present invention is equally applicable to any link quality factors.

If the link quality factor used is received power, then the signal from base station 50 received at mobile station 30 by antenna 38 and provided to receiver (RCVR) 42 which provides an indication of the received power to control processor 46. If the link quality factor used is the detection of frame errors, then receiver 42 downconverts and amplifies the signal providing the received signal to traffic demodulator 43. If the traffic signal is accompanied by a pilot signal in order to provide for coherent demodulation then the received signal is also provided to pilot demodulator 45 which demodulates the signal in accordance with a pilot demodulation format and provides a timing signal to traffic demodulator 43. Traffic demodulator 43 demodulates the received signal in accordance with a traffic demodulator format. In the exemplary embodiment, traffic demodulator 43 and pilot demodulator 45 are CDMA spread spectrum demodulators, the design of which is described in the aforementioned U.S. Pat. Nos. 4,901,307 and 5,103,459. Traffic demodulator 43 provides the demodulated signal to decoder 44. In a first exemplary embodiment, decoder 44 performs error—detection decoding to determine if errors have occurred. Error detection/correction decoders such as the Viterbi trellis decoder are well known in the art. In an alternative embodiment, decoder 44 decodes the demodulated signal and then re-encodes the decoded signal. Decoder 44 then compares the re-encoded signal with the demodulated signal to obtain an estimate of the channel symbol error rate. Decoder 44 provides a signal indicating an estimated channel symbol error rate to control processor 46.

Control processor 46 compares the received power or estimated channel symbol error rate referred to generically as the link quality factor against a threshold or set of thresholds which may be static or varying. Control processor 46, then provides the power control information to either encoder 34 or power control encoder (P.C. ENC.) 47. If the power control information is to be encoded into the data frame, then the power control data is provided to encoder 34. This method requires that an entire frame of data be processed before transmitting the power control data, then encoded traffic data containing power control data are provided to transmitter (TMTR) 36 through modulator 35. In an alternative embodiment, the power control data may simply overwrite portions of the data frame or may be placed in predetermined vacant positions in the transmission frame. If the power control data overwrites traffic data, then this may be corrected by forward error correction techniques at base station 50.

In implementations that process a full frame of data before providing the power control data, the delay waiting for a full frame to be processed is undesirable in fast fade conditions. The alternative is to provide the power control data directly to modulator 35 where it may be punctured into the outgoing data stream. If the power control data is transmitted without error correction coding then control processor 46 outputs the power control data directly to modulator 35. If error correction coding is desired for the power control data, control processor 46 outputs the power control data to power control encoder 47 which encodes power control data without regard to the outgoing traffic data. Power control encoder 47 provides the encoded power control signal to modulator 35 which combines the encoded power control signal with the outgoing traffic data provided from data source 32 through encoder 34 to modulator 35.

Transmitter 36 upconverts and amplifies the signal and provides it to antenna 38 for transmission to base station 50.

The transmitted signal is received at antenna 52 of base station 50 and provided to data receiver (RCVR) 54 where it is downconverted and amplified. Receiver 54 provides the received signal to demodulator 55 which demodulates the received signal. In the exemplary embodiment, demodulator 55 is a CDMA spread spectrum demodulator which is described in detail in the aforementioned U.S. Pat. Nos. 4,901,307 and 5,103,459. If the power control data is encoded within a frame of traffic data, then the traffic and power control data is provided to decoder 56. Decoder 56 decodes the signal and separates the power control signal from the traffic data.

If, on the other hand the power control data is not encoded with a full frame of data but rather punctured into the transmission stream of data, then demodulator 55 demodulates the signal and extracts the power control data from the incoming data stream. If the power control signal is not encoded then demodulator 55 provides the power control data directly to control processor 58. If the power control signal is encoded then demodulator 55 provides the encoded power control data to power control decoder (P.C. DEC.) 100. Power control decoder 100 decodes the power control data and provides the decoded power control data to control processor 58. The power control signal is provided to control processor 58, which in accordance with the power control signal provides a control signal to transmitter 64 indicative of a modified transmission power level.

One of the inherent problems with closed-loop power control systems is a relatively slow response time, relative to an open-loop power control system. For example, in a closed-loop power control system, when base station 50 transmits a frame at an insufficient transmission energy to mobile station 30, mobile station 30 receives and decodes the frame, determines whether the frame is in error, prepares a power control message indicating the frame error, then transmits the power control message to base station 50, which decodes the frame, extracts the power control message and adjusts the transmission power of transmitter 64. This results in a four frame time log before correction is apparent at mobile station 30. Thus, if the propagation path has deteriorated, four consecutive frames would be transmitted at the same insufficient frame energy before a frame is transmitted at the adjusted frame energy. In this delay period the fading condition may have substantially improved or deteriorated.

The following are methods by which to improve the responsiveness of a closed power control system. In a first exemplary embodiment of the present invention, the base station assumes the worse case. That is that the propagation path has deteriorated during the four frame delay period. In response the base station increases the transmission energy to that user by a relatively significant amount $\Delta E$ so that the adjustment will be more than adequate to assure the power adjusted frame will be properly received even if the propagation path has deteriorated in the interim. In one implementation, the relatively significant amount $\Delta E$ is at least one decibel. In the exemplary embodiment of a spread spectrum communication system, this increase in power to mobile station 30 causes less power to be available for other users who share the forward link. So the base station transmitter quickly reduces the transmission energy for that user following the initial increase. In the exemplary embodiment, the base station increases the energy by a fixed amount $\Delta E$ holds that value for a delay period to verify that the increase in transmission energy has been effective and then decreases the transmission energy in accordance with a predetermined piecewise linear function as illustrated in FIG. 3.

Figure 3:
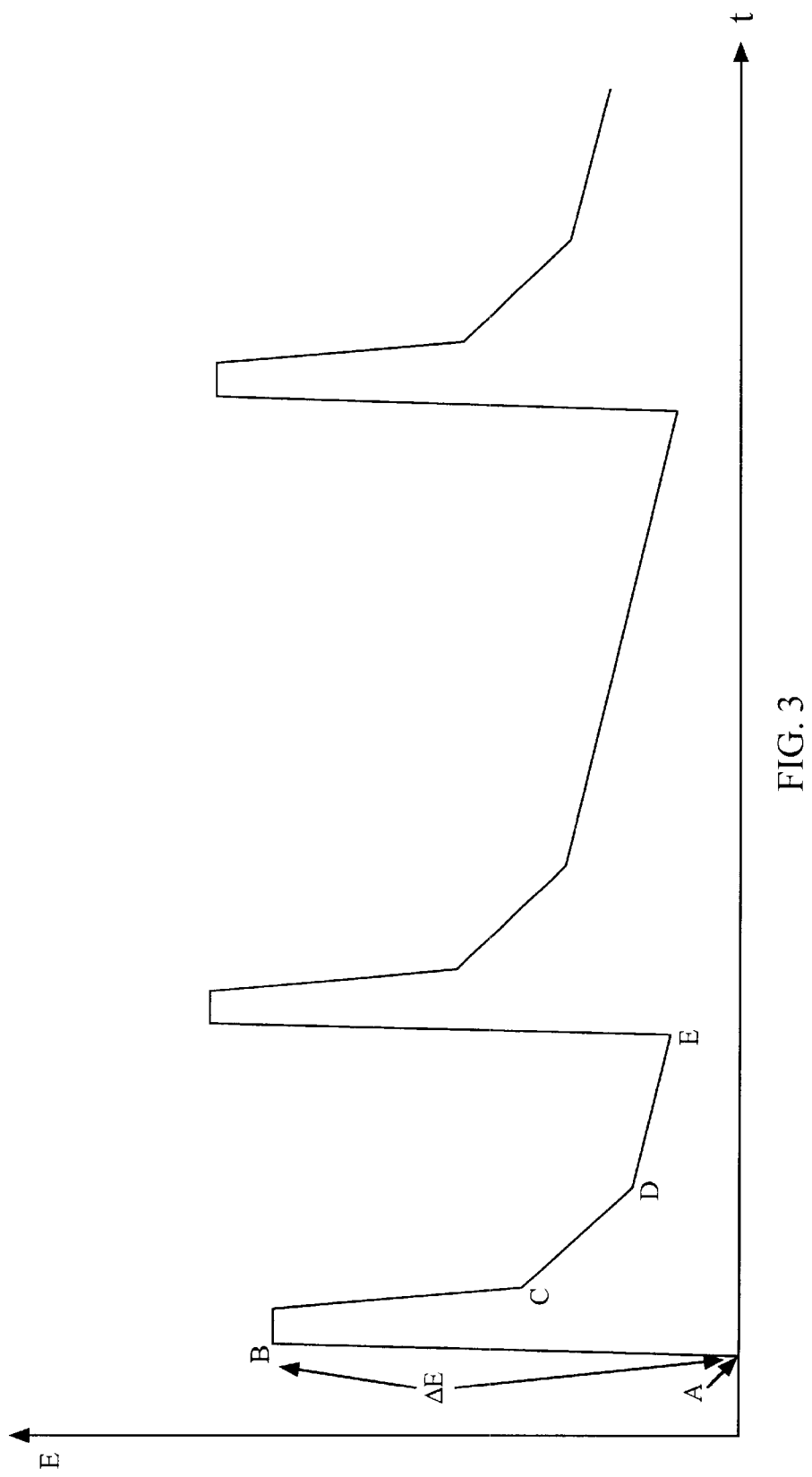
FIG. 3 is an illustration of a curve illustrating the delay time entailed in a closed loop power control system.

FIG. 3 illustrates a plot of the transmission energy (E) against time. At point A the base station 50 increases the transmission energy in response to a power adjustment request from mobile station 30. Base station 50 increases the transmission energy by an amount $\Delta E$ to point B. Base station 50 holds transmission at that transmission energy for a predetermined delay period then reduces the transmission energy at a swiftly decreasing rate for a predetermined number of frames to point C. At point C, the power control message from mobile station 30 still indicating an excess of transmission energy, base station 50 continues to decrease the transmission energy, however, the rate of the decrease is less. Again, base station 50 decreases at this intermediate rate of decrease for a predetermined number of frames until point D. At point D the rate of decrease is again reduced to a final decreasing rate at which the transmission energy will continue to be decreased until base station 50 reaches some minimum value or it is alerted again by another power adjustment request from mobile station 30, which occurs at point E. This power adjustment continues throughout the duration of the service provided.

Base station 50 performs the adjustment of the transmission energy with knowledge that after the transmission energy has been increased there will be a delay before the received power control information will reflect the change in the forward link transmission power. If the propagation channel suddenly worsens, base station 50 will receive a series of consecutive power control requests, and there will be a delay before the power adjustment requests are responsive to the change in forward link transmission energy. During this delay period, base station 50 should not continue to increase the transmission energy for each receives power adjustment request. This is the reason that the power level is held constant for a predetermined delay period as illustrated in the period following point B of FIG. 3.

It should also be noted that errors in a mobile communication system come in two types. Those that are random and those that are the result of a change in the propagation path. In the exemplary embodiment, when base station 50 receives a power adjustment request, it increases the transmission power by $\Delta E$ as described previously. Then it ignores the power adjustment requests and retains the same increased power level for the delay period. In an alternative embodiment, base station 50 adjusts the power in accordance with each power control message. However, smaller changes would typically be used. This minimizes the impact of random errors.

One of the main influences that results in changes in the characteristics of the propagation path between mobile station 30 and base station 50 is motion by mobile station 30 towards or away from base station 50. Mobile station 30 may provide base station 50 with information indicating that the mobile station velocity is changing or it may actually provide its velocity relative to base station 50. If the mobile station is simply providing an indication that its velocity is changing, it may provide that information as a power adjustment request signal in anticipation of a change in the quality of the propagation path.

In a first embodiment, mobile station 30 may sense the change in velocity by providing a sensor to operate in accordance with a signal from the automobile tachometer or speedometer (not shown). In an alternative embodiment, mobile station 30 determines either a change in the mobile/base station relative velocity or absolute velocity by changes in the received signal from base station 50. Mobile station 30 may detect a change in velocity or measure the absolute relative velocity by measuring the Doppler effect on the incoming signal from base station 50. In an alternative embodiment, base station 50 may also detect a change in the mobile/base station relative change in velocity or measure the absolute relative velocity by measuring the Doppler effect on the incoming signal from mobile station 30.

The traffic signal provided by base station 50 may be accompanied by a pilot signal in order to provide for coherent demodulation of the received traffic signal. Use of a pilot signal is described in U.S. Pat. Nos. 4,901,307 and 5,103,459, and mobile station 30 can alternatively sense changes in the relative velocity the Doppler shift of the pilot signal.

In a preferred embodiment, when base station 50 knows the velocity of mobile station 30 and will vary the value of the incremental change in transmission energy, $\Delta E$, will vary in accordance with this velocity. The determination of the value of $\Delta E$ may be performed algorithmically or by a lookup table in control processor 46.

If base station 50 transmits a pilot signal along with the traffic signal, the pilot signal can be thought of as a traffic signal that carries a predetermined bit stream known by mobile station 30. Mobile station 30 demodulates the pilot channel in pilot demodulator 45 in order to get timing information to enable mobile station 30 to perform coherent demodulation of the traffic channel. Because the pilot channel and the traffic channel are provided through similar if not identical propagation paths, there is a strong correlation between the strength of the received pilot signal and the strength of the received traffic signal. By basing the generation of the power control signal on the pilot channel instead of the traffic channel, the delay between receiving the signal transmitted from base station 50 and generation of the power control signal may be reduced.

Referring to FIG. 2, pilot modulator 65 provides a pilot signal to transmitter 64 and transmitter 64 of base station 50 provides the pilot signal along with the traffic signal to antenna 52 for broadcast to mobile station 30. The transmitted signal is received at antenna 38 and provided to receiver 42. Receiver 42 downconverts and amplifies the pilot signal and provides the received pilot signal to pilot demodulator 45 generates a quality estimate of the demodulated pilot signal and provides it to control processor 46. Control processor 46 generates a power control signal in accordance with the quality estimate of the demodulated pilot signal and the operation proceeds as described previously.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for controlling transmission power levels, comprising:
   determining a velocity of a first station;
   using the velocity of the first station at a second station to determine an anticipatory power adjustment; and
   making the anticipatory power adjustment prior to receiving a power adjustment request signal from the first station.

2. The method of claim 1, wherein said determining the velocity of the first station is performed by a motion sensor at the second station.

3. The method of claim 1, wherein said determining is based on determining the velocity of the first station by a sensor at the second station that detects a shift in an incoming traffic signal from the first station.

4. The method of claim 1, wherein said determining is based on determining the velocity of the first station by a sensor at the second station that detects selected changes in an incoming traffic signal received from the first station.

5. The method of claim 3, wherein said determining the velocity of the first station is based on determining changes in relative velocity of the first and second stations by measuring a Doppler shift in a pilot signal.

6. An apparatus for controlling transmission power levels, comprising:
   means for determining a velocity of a first station;
   means for using the velocity of the first station at a second station to determine an anticipatory power adjustment; and
   means for making the anticipatory power adjustment prior to receiving a power adjustment request signal from the first station.

7. The apparatus of claim 6, wherein the means for determining the velocity of the first station is a motion sensing means.

8. The apparatus of claim 6, wherein the means for determining the velocity determines the velocity by determining any shift in an incoming traffic signal from the first station.

9. The apparatus of claim 6, wherein the means for determining the velocity determines the velocity by determining selected changes in the incoming traffic signal received from the first station.

10. The apparatus of claim 8, wherein the means for determining the velocity determines velocity by measuring the Doppler shift in a pilot signal.

11. An apparatus for controlling transmission power levels, comprising:
   a control processor for determining an anticipatory power adjustment of a transmission power based upon a velocity of a mobile station and to generate a signal that is indicative of the anticipatory power adjustment; and
   a transmitter for receiving the signal that is indicative of the anticipatory power adjustment and to modify the transmission power.

* * * * *